Sept. 28, 1937.  E. H. THOMPSON  2,094,029
FARE BOX
Filed Jan. 10, 1935   7 Sheets-Sheet 1
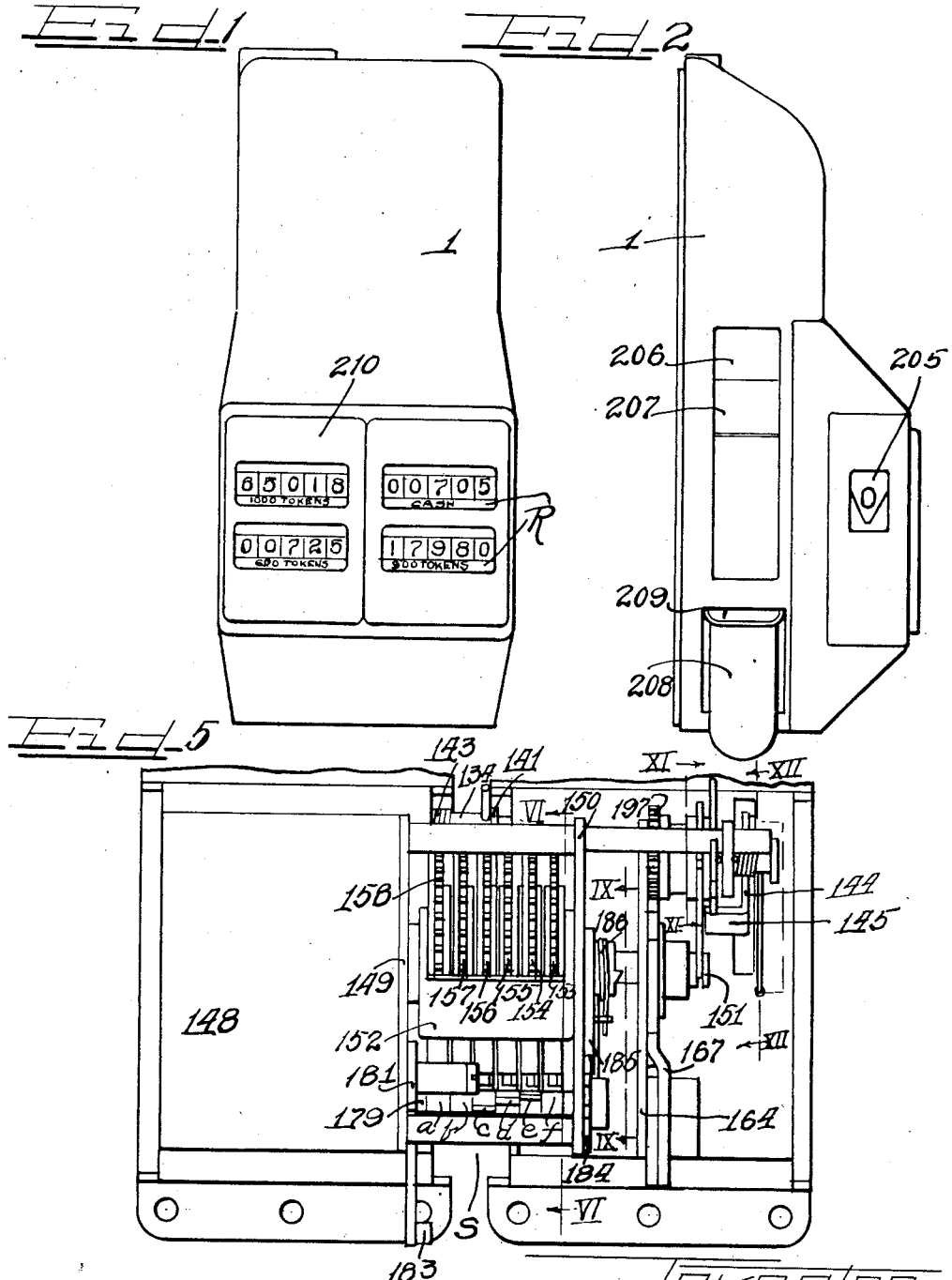
Inventor
Ernest H. Thompson.

Sept. 28, 1937.  E. H. THOMPSON  2,094,029
FARE BOX
Filed Jan. 10, 1935  7 Sheets-Sheet 2
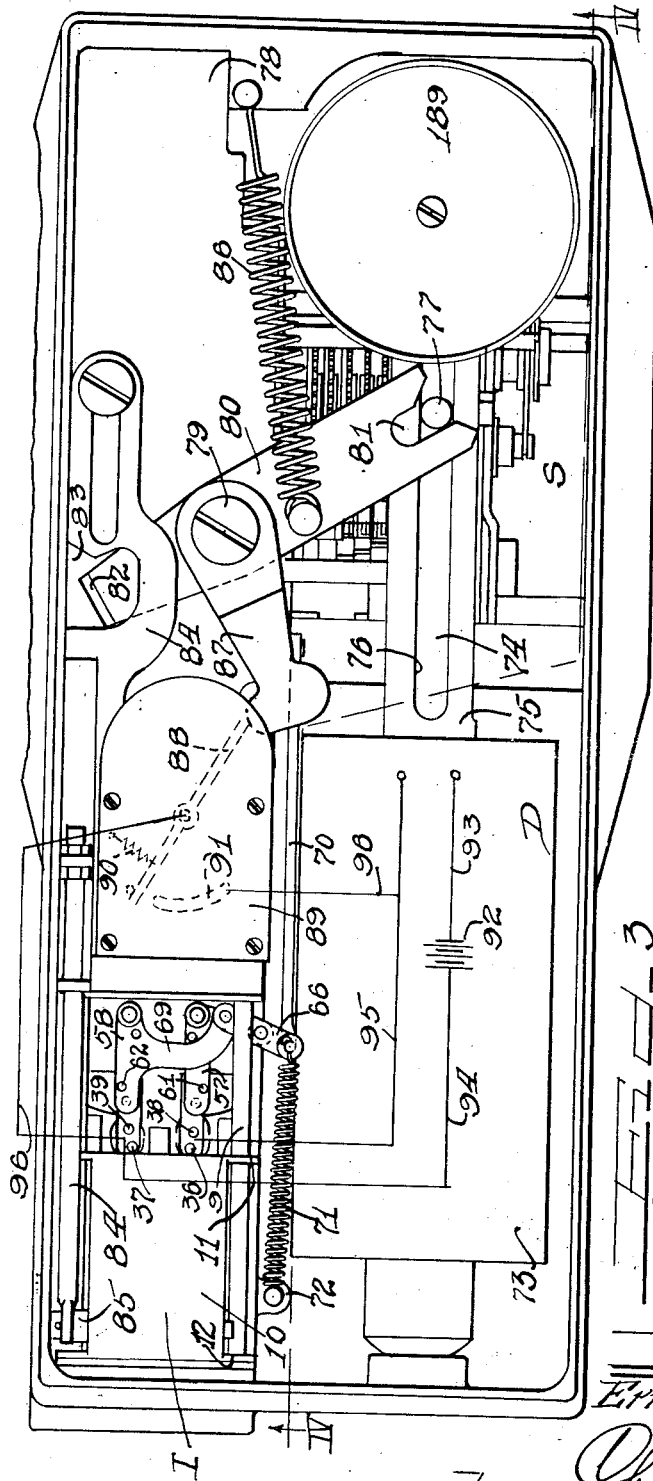
Inventor
Ernest H. Thompson Sept. 28, 1937.　　　　　E. H. THOMPSON　　　　2,094,029
FARE BOX
Filed Jan. 10, 1935　　　　7 Sheets-Sheet 3
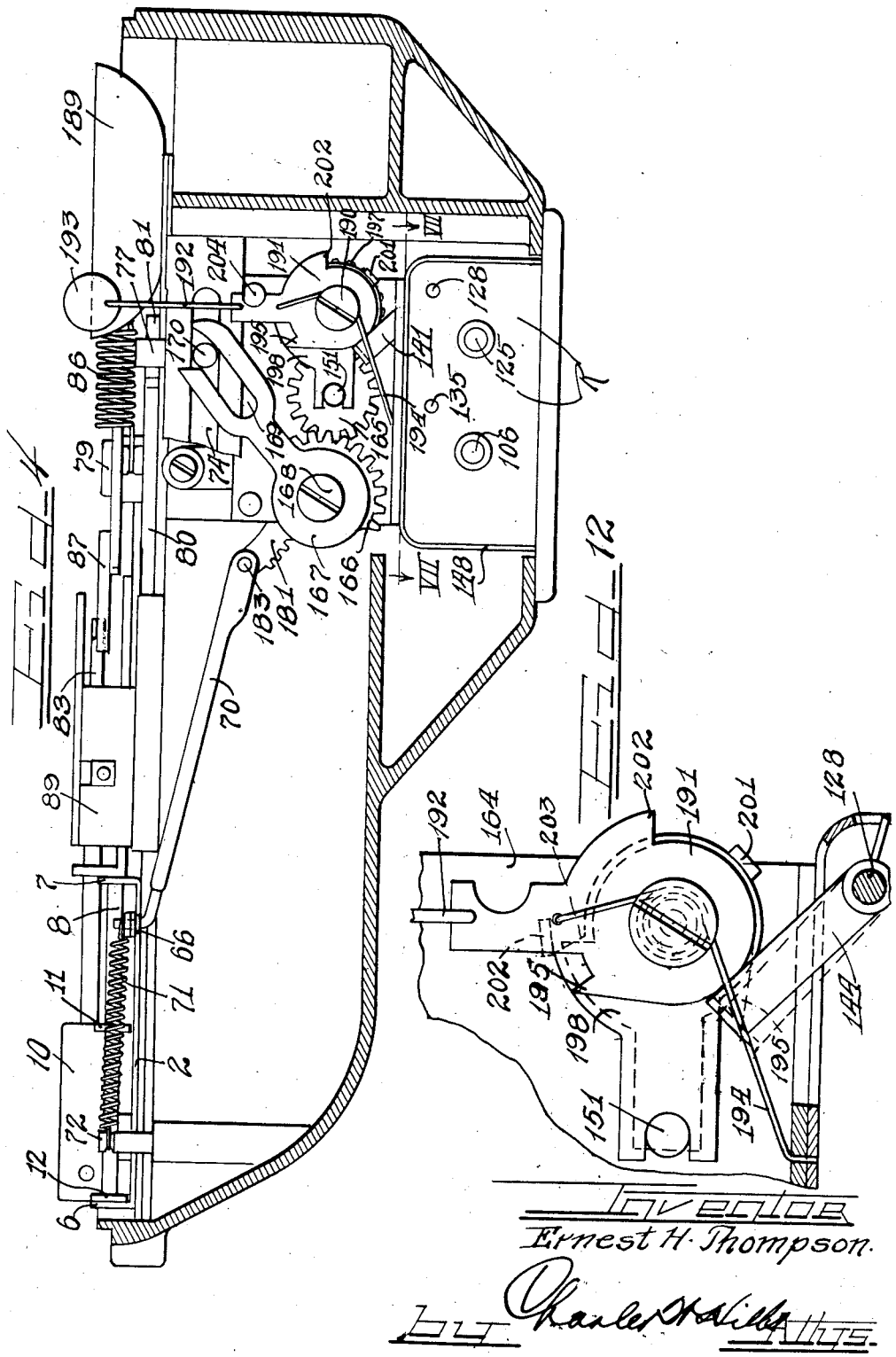

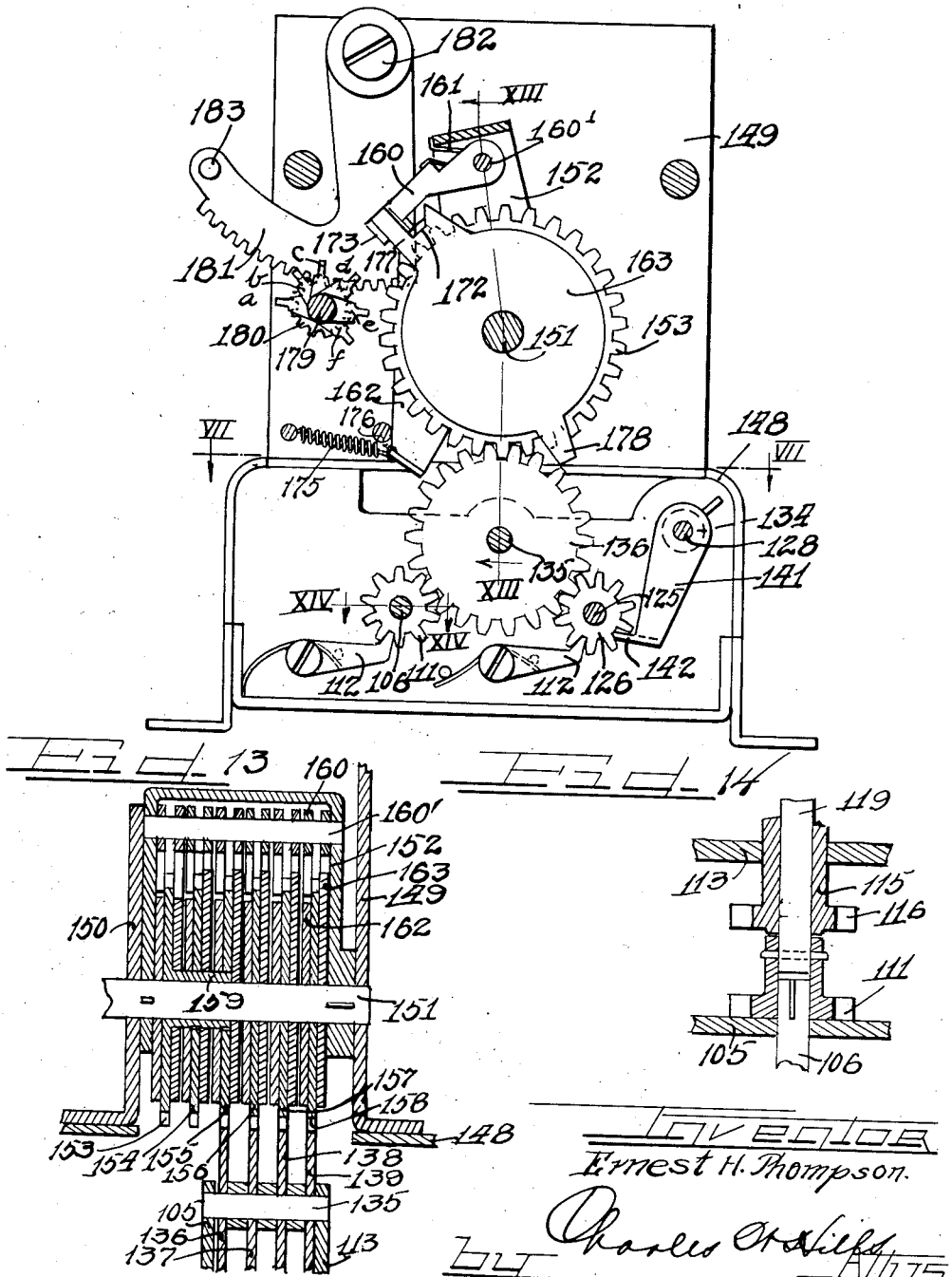

Sept. 28, 1937.  E. H. THOMPSON  2,094,029
FARE BOX
Filed Jan. 10, 1935   7 Sheets-Sheet 5
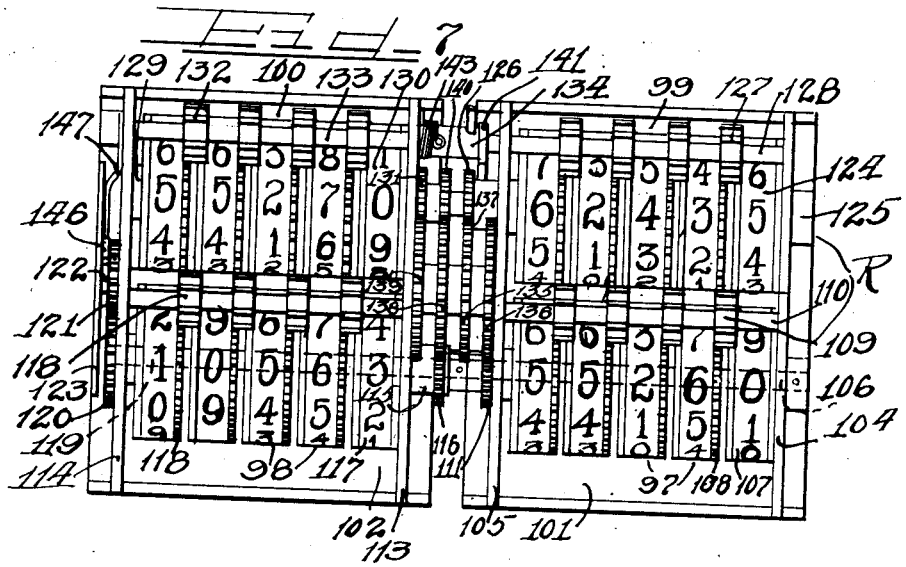
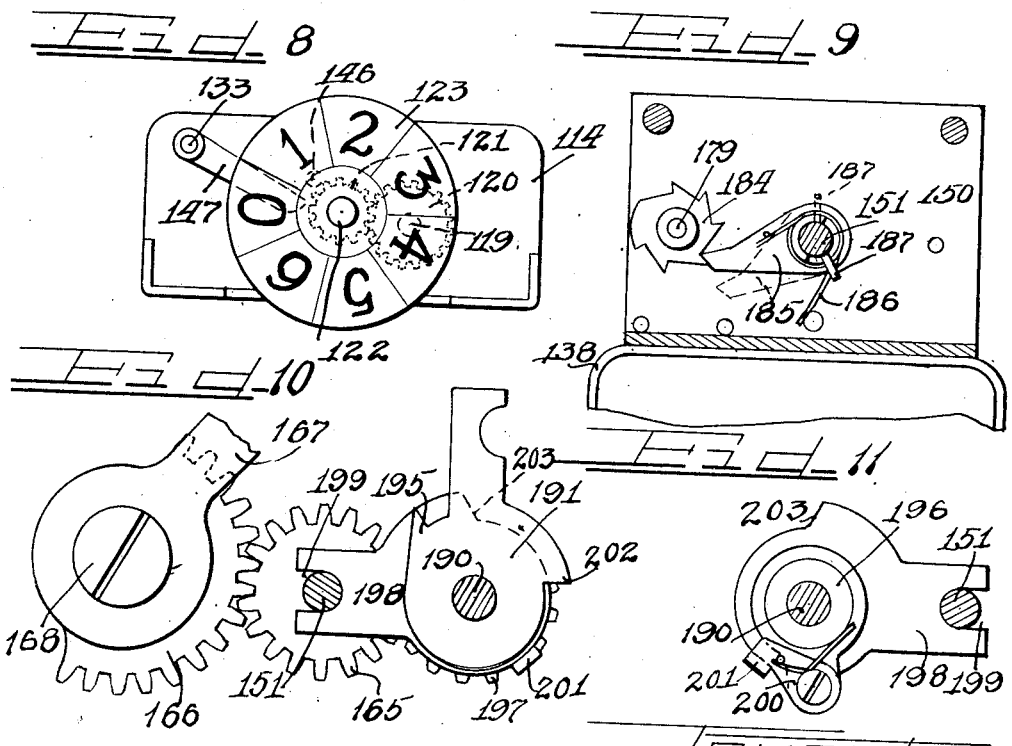
Inventor
Ernest H. Thompson

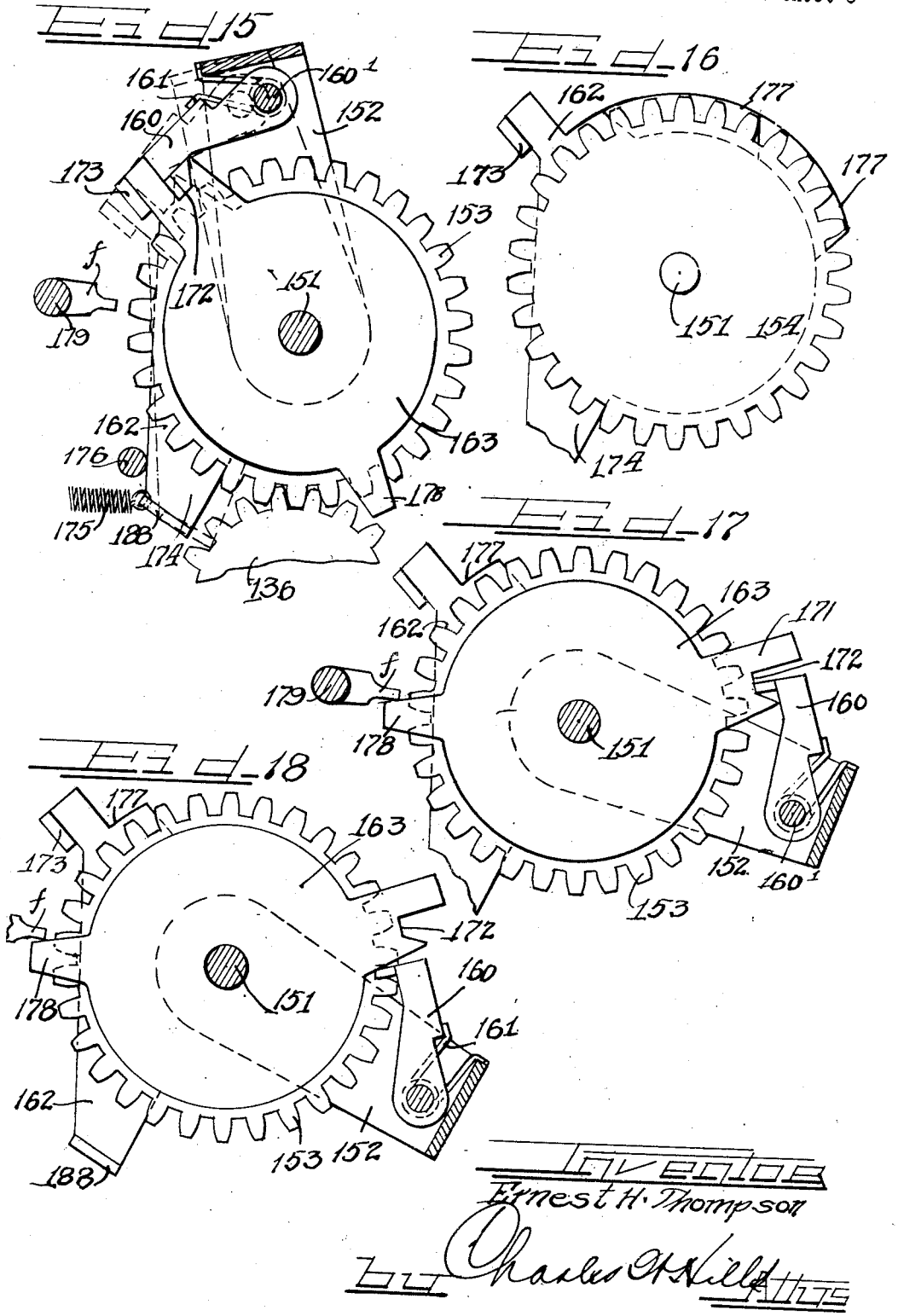

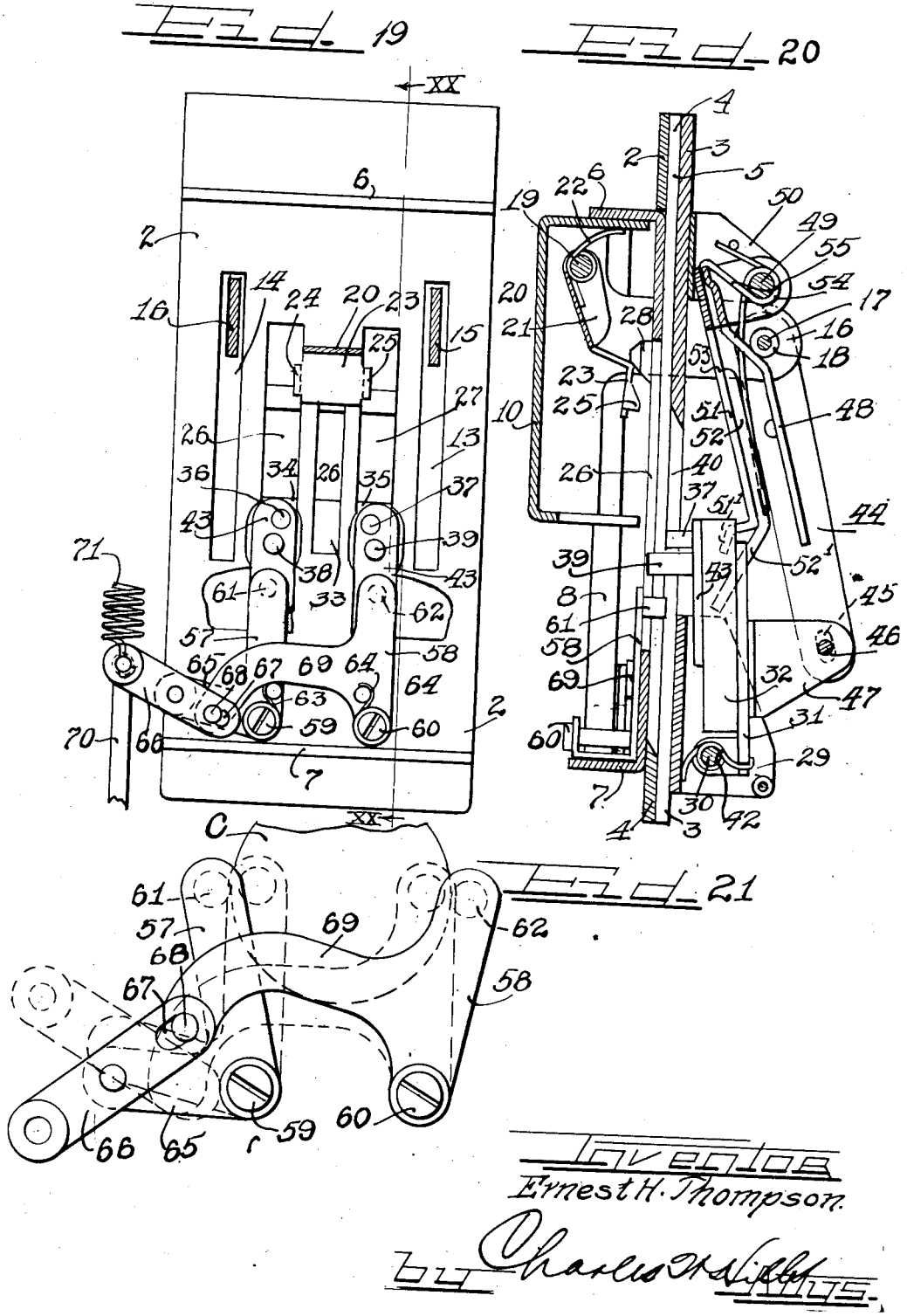

Patented Sept. 28, 1937

2,094,029

UNITED STATES PATENT OFFICE 2,094,029

FARE BOX

Ernest H. Thompson, Hubbard Woods, Ill.

Application January 10, 1935, Serial No. 1,125

17 Claims. (Cl. 235—32)

My invention relates to fare boxes of the type disclosed in my Patent No. 1,894,071, issued January 10, 1933, which fare box is designed to separately register coins, each representing a cash fare, and fare tokens of less diameter than that of the fare coins.

An important object of the present invention is to produce a fare box of the type referred to above which will on separate registers count deposited cash and a plurality of tokens representing different fare values, and where a cash fare cannot be met by a single coin but requires several coins, as, for example, where a cash fare is seven cents and either two pennies and a nickel must be deposited or seven pennies must be deposited to meet the fare.

Another important object is to provide indicating means from which the conductor or other attendant may note whether sufficient cash has been deposited by a passenger or patron to pay for one fare or to pay for a certain number of fares.

A further object is to provide fare payment indicating means, preferably audible, to sound once for each cash fare deposited, and whether coins for a single fare are deposited or whether more or different coins are deposited to pay for a plurality of fares.

A further important object is to provide a more simple and efficient selecting means for selecting for operation one of a number of registers for counting a deposit, one of the registers counting deposited cash, and deposited tokens being each counted by a separate register.

A still further object is to provide simplified setting means controlled by the diameter of a deposit, whether a coin or token, for setting the selecting mechanism for selecting for operation of the corresponding register.

Another important object of the invention is the combination of the selecting mechanism and the registering mechanism into a compact unitary structure which may be readily removed from the housing for inspection, adjusting or repairs.

The above referred to and other features of my invention are shown incorporated in the structure disclosed on the accompanying drawings, in which drawings:

Figure 1 is a front elevation of the fare box;

Figure 2 is a side elevation;

Figure 3 is an enlarged rear elevation with the cover removed;

Figure 4 is a section on plane IV—IV Figure 3;

Figure 5 is an enlarged rear view of the selective and register mechanism assembly;

Figure 6 is an enlarged section on plane VI—VI Figure 5;

Figure 7 is an inner side view of the register assembly looking at plane VII—VII Figure 6;

Figure 8 is a left end view of the structure shown in Figure 7;

Figure 9 is an end view of the selector mechanism assembly looking at plane IX—IX Figure 5;

Figure 10 is an enlarged side view of the bell striker controlling train;

Figure 11 is a view of striker resetting mechanism looking at plane XI—XI Figure 5;

Figure 12 is an enlarged section on plane XII—XII Figure 5 showing the striker mechanism and releasing and resetting means therefor;

Figure 13 is a section on plane XIII—XIII Figure 6;

Figure 14 is a section on plane XIV—XIV Figure 6;

Figure 15 is an enlarged view of the selector train shown in Figure 6;

Figure 16 is a side view of one of the selector mechanism driving gears and a pawl camming member associated therewith;

Figure 17 is a view similar to Figure 15 showing the parts in position just before release of the gear operating pawl;

Figure 18 is a view similar to Figure 15 showing the pawl just released and meshing with the driving gear;

Figure 19 is an elevation of the deposit receiving and impeller mechanism with the impeller carriage removed;

Figure 20 is a section on plane XX—XX Figure 19.

Figure 21 is an enlarged view of the selector member setting leverage controlled by the diameter of a deposited coin or token.

The operating structure comprises deposit receiving and impeller mechanism, designated as a whole I; selective mechanism, designated as a whole S; register mechanism, designated as a whole R, and power driving means, designated as a whole D. These various operating mechanisms are all contained within a housing 1. In the arrangement shown, the power driving means D is located at one side of the housing with the deposit receiving and impeller mechanism I alongside thereof, while the selective and register mechanisms are combined in a unitary structure located in the housing below the power driving and impeller means.

*The deposit receiving and impeller mechanism*

The structure and operation of the receiving and impeller mechanism is best shown in Figures 19 to 21. The body of the structure comprises a front plate 2, a rear plate 3, and a spacing plate 4, the plates being rigidly secured together and the spacing plate being cut away to leave the coin chute 5 which is open at the top to the exterior of the housing for the insertion of coins or tokens.

The front plate 2 has upper and lower forwardly extending flanges 6 and 7 between which extend the guide rods 8 and 9 for supporting the impeller carriage 10 for vertical reciprocation, upper and lower ears 11 and 12 on the carriage receiving the rods. Extending rearwardly from the side walls of the impeller carriage 10 and through vertical slots 13 and 14 in the impeller mechanism supporting body are arms 15 and 16 which at their outer ends receive a cam shaft 17 on which is the cam roller 18. Extending horizontally through the upper part of the impeller carriage and journalled in the side walls thereof is a shaft 19 on which the impeller frame 20 is hung by means of its guide ears 21. A coil spring 22 encircles the shaft and abuts against the carriage and the impeller member and tends to swing the impeller member towards the coin chute 5.

The lower end 23 of the impeller member forms a flat shoe for engagement against the front wall 2, abutment flanges 24 and 25 projecting from the shoe through longitudinal slots 26 and 27 in the wall 2 when the shoe is in engagement with the wall. However, when the impeller carriage is at the upper part of its stroke, the impeller shoe is held away from the wall 2 by its engagement with a cam boss 28 on the wall 2. After the initial short downward movement of the impeller carriage, the impeller shoe leaves the cam boss so that the spring 22 may swing the impeller for engagement of the shoe with the wall 2 and for the projection of the abutment flanges 24 and 25 into the coin chute 5 for cooperation with deposited coins or tokens, as will be explained in detail later.

Secured against the rear side of the wall 3 at the bottom thereof is a U-shaped bracket 29 between which sides is supported a shaft 30 on which is mounted a frame 31 supporting a block 32 of insulating material. At its upper end the insulating block has a longitudinally extending slot 33 forming legs 34 and 35. At their ends the legs 34 and 35 have upper short contact pins 36 and 37, respectively, and below these short pins, longer contact pins 38 and 39 extend from the legs. The short pins extend through slots 40 in the wall 3 for engagement with the face of a deposited coin or token, these slots being in registration with the slots 26 and 27 in the front wall 2. The longer pins are of sufficient length to extend through the registering slots for engagement with the lower edge of a deposited coin or token to form a support therefor.

A spring 42 tends to hold the frame 31 and insulating block swung upwardly and inwardly into position to receive and support a coin or token immediately after deposit thereof, the coin then electrically connecting the pins 36 and 38 with the pins 37 and 39 for closing an electrical circuit. The pins 36 and 38 are in contact with the frame 31 which forms the grounded terminal for the electrical circuit, the pins 37 and 39 being contacted by a plate 43 which forms the other terminal of the circuit which will be referred to more in detail later.

Receiving at its upper end the shaft 17 is a link 44 which at its lower end has the longitudinal slot 45 receiving the pin 46 extending from the arm 47 on the frame 31 which supports the insulating block 32. When the impeller carriage is in its uppermost position, the upper end of the slot 45 will be above the pin 46 and the insulating contact block will remain in its inner position with its contact posts within the coin chute 5. However, after an initial downward movement of the impeller carriage, the slot will reach the pin and thereafter the frame 31 and the supported insulating block will be swung downward to withdraw the contact posts from the coin chute for releasing a coin or token for further downward movement thereof in the coin chute.

The coin retaining and guiding lever structure is substantially the same as that disclosed in my Patent No. 1,896,649, issued February 7, 1933. It comprises a cam lever 48 hinged on a shaft 49 supported in the bracket 50 secured to the rear wall 3 above the cam shaft 17, the cam lever extending downwardly below the cam roller 18 for engagement thereby. Between the cam lever and the plate 3 is the pressure lever 51 also hinged on the shaft 49. Between the cam lever and the pressure lever is the guide and retaining lever 52 which at its upper end has fulcrum connection with the lever 51, as indicated at 53, a spring 54 tending to hold the lever 52 against the lever 51. A coil spring 55 is anchored at one end to the bracket 50 and at its other end engages with the lever structures 48 and 51 to normally yieldingly hold said structures in outwardly swung position away from the coin chute.

During initial downward movement of the impeller carriage 10 and before the contact pin supporting structure is swung away from the coin chute, the cam roller 18 engages with the cam lever 48 to swing the lever structure for engagement with a deposited coin or token. The deposited coin or token drops with its lower edge against the long contact pins 38 and 39 and with its face against the shorter contact pins, the coin thus acting as a switch blade to close a circuit for electrically operated driving means hereinafter referred to for controlling the reciprocation of the impeller carriage. As the circuit is closed by the coin, the driving means becomes operative to shift the impeller carriage downwardly and during the initial movement the lever structure is swung for engagement of the pressure foot 51' on the lever 51 against the face of the coin and the projection 52' on the lower end of the lever 52 below the lower edge of the deposited coin or token so that the lever structure will assume the support of the coin as the contact and supporting structure is swung away from the coin chute by the further downward movement of the impeller carriage.

During the initial downward movement of the impeller carriage, the foot 23 of the impeller member 20 is released from the cam boss 28 so that the impeller may swing to project the abutment flanges 24 and 25 through the slots 26 and 27 and above the upper edge of the deposited coin or token. Thereafter, during continued downward movement of the impeller carriage, the coin will be shifted downwardly by the impeller member for engagement of the coin with the setting means for the selector mechanism for selection for operation of the corresponding register. When the impeller carriage reaches the lower end of its movement, the coin which has been shifted downwardly will still be held in the coin chute by the lever 52, and retention of the coin is maintained until the impeller carriage is returned to its upper position and the cam roller 18 withdrawn from the cam lever 48 for withdrawal of the lever structure by the spring 55.

The setting means comprises two levers 57 and 58 pivoted at their lower ends by pivot pins 59 and 60 extending from the wall 2. At their upper ends the levers have the abutment fingers 61 and 62, respectively, extending therefrom into the coin chute and in the path of the downwardly impelled coin or token C, the final downward movement of the coin by the impeller carrying it between the fingers 61 and 62 for spreading apart of the levers 57 and 58 a distance according to the diameter of the coin or token. Springs 63 and 64 extending between the pivot posts and the levers tend to hold the levers in normal vertical position for reception and spreading apart thereby by the downwardly impelled coin or token. The spreading movement of the levers by a coin is communicated to a registering selector element in the selective mechanism which will be described in detail later.

As the difference in diameters of various coins or tokens may be comparatively slight, it is desirable to multiply the spreading movement of the levers so that there will be sufficient operation of the selector element. As shown, the lever 57 has a laterally extending arm 65 at its pivot end, to the outer end of which is pivoted a lever 66, the inner end of which lever 66 has a slot 67 for receiving the pin 68 at the end of an arm 69 extending laterally from the lever 58 intermediate the ends thereof. The swing of the lever 57 by the engagement of a coin or token therewith will cause the outer end of the lever 66 to travel downwardly a certain distance, and, at the same time, engagement of a coin or token with the lever 58 will transmit the swing of this lever through the arm 69 to the inner end of the lever 66 for additional downward movement of the outer end of the lever 66. This multiplied total movement of the outer end of the lever 66, which movement depends upon the diameter of the particular token or coin, is transmitted to the selector element by a link 70. A spring 71 extending between the lever 66 and the bracket 72 on the wall 2 tends to hold the lever 66 in upper normal position with the spread levers in position for receiving the impelled coin or token.

The power driving mechanism

The power driving means for reciprocating the impeller carriage and for operating the register structure is shown in the form of a solenoid 73, whose plunger 74 is guided in a tube 75 having a slot 76 through which extends a pin 77 secured to the plunger. On a partition wall 78 within the housing 1 is a pivot stud 79 on which a lever 80 is pivoted intermediate its ends. At one end the lever has a notch or recess 81 for receiving the pin 77 on the solenoid plunger so that when the plunger moves vertically the lever 80 will be swung. At its other end the lever has an abutment lug 82 extending into the notch 83 of an actuating lever 84 which is connected at its upper end with a pin 85 extending from the impeller carriage 10, the arrangement being such that when the solenoid plunger is raised the impeller carriage will be moved downwardly and when the plunger returns the carriage will be restored to its upper position. A spring 86 connected between the lever 80 and the bottom of the housing assists gravity in returning the solenoid plunger to its lower or normal position.

Secured to and extending upwardly from the lever 80 is an arm 87 which coacts with a switch lever 88 within the housing 89 below the impeller mechanism, a spring 90 normally withholding the switch lever from a contact 91.

A source of current, such as a battery 92, supplies energy for operating the solenoid. One terminal of the solenoid winding is connected by a conductor 93 with one pole of the battery and the other pole of the battery is connected by a conductor 94 with the terminal plate 43 with which the contact pins 37 and 39 are connected. The frame 31 with which the contact pins 36 and 38 engage is connected by a conductor 95 with the other terminal of the winding. Thus, when a coin or token is deposited and received by the contact pins in the impeller mechanism, a primary circuit is closed through the solenoid winding, and the solenoid plunger is raised, such movement causing swing of the lever 80 and downward shift of the link 84 with the impeller carriage 10. I preferably utilize the coin or token only momentarily for closing the solenoid circuit, and I therefore provide the swing 88 for relieving the coin of current after initial closure of the solenoid circuit. The arrangement of the switch lever 88 is such that when the lever 80 is swung upwardly, the arm 87 thereon will engage with and swing the switch lever into contact with the terminal 91 to close the shunt circuit 96 around the impeller mechanism contact, the closure of the shunting switch taking place during the initial downward movement of the impeller carriage and the shunt circuit being closed just before the contact pins are withdrawn from the coin during further downward movement of the impeller carriage.

The circuit will be maintained through the solenoid until the plunger has reached the upper part of its travel, at which time the arm 87 will have passed by the end of the switch lever 88, and the switch lever released for return to open position by the spring 90. The solenoid being then de-energized, the plunger will be returned to its normal lower position by the force of gravity and the pull of the spring 86. The thickness of the coin chute 5 is such relative to the thickness of the coins and tokens that such coins and tokens may be deposited into the chute only one at a time. For each coin or token deposited the solenoid plunger will be drawn upwardly and then released by the opening of the energizing circuit. During the upward movement of the plunger the coin is impelled downwardly by the impeller mechanism, the final impelled movement of the coin passing it between the setting levers 57 and 58 for spreading of the levers in accordance with the coin diameter and for corresponding downward movement of the outer end of the lever 66 and the link 70 for corresponding setting of the selector element. During downward movement of the plunger, the impeller carriage is returned to its upper position, and during such upward movement the contact mechanism is returned to position the contact pins for reception of the next deposited coin or token. During the final upward movement of the carriage the roller 18 is withdrawn from the lever mechanism which is then released from the coin or token so that the coin is free to pass on to a receiving chamber for inspection by the conductor or attendant. During downward movement of the plunger the selector mechanism is operated for entry of the coin or token in the corresponding register.

The register mechanism

The fare box disclosed is designed for the deposit and counting of cash in the form of pennies, nickels and dimes, and for receiving and counting tokens, respectively, of one inch diameter, nine-tenths inch diameter and six-tenths inch diameter. Four registers are therefore provided, the register 97 counting and totalizing the cash deposits, the register 98 counting the one inch tokens, the register 99 counting the nine-tenths inch tokens and the register 100 counting the six-tenths inch tokens.

A frame 101 supports the cash register and the nine-tenths inch token register, a similar frame 102 supporting the one inch and the six-tenths inch token register, the frames being alongside of each other to form a rectangular supporting structure.

The various decimal order dial wheels of the cash register are assembled between the side walls 104 and 105 of the frame 101 and surround a shaft 106 journalled in the side walls and to the outer end of which the units dial wheel 107 is secured. The other decimal order dial wheels are rotatable on the shaft 106 and are rotated in proper sequence by carry-over gears 108 on the dial wheels and carry-over pinions 109 on a shaft 110 journalled in the side walls 104 and 105.

At its inner end and outside of the wall 105 the shaft 106 carries a drive pinion 111 by which the register is driven. A detent pawl 112 permits only forward movement of the register.

The one inch token register 98 is assembled between the side walls 113 and 114 of the frame 102, the decimal order dial wheels receiving a shaft 115 journalled in the side walls and carrying at its inner end the drive pinion 116. The units dial 117 is secured to the shaft, the other decimal order dial wheels being rotatably mounted on the shaft for proper operation by carry-over mechanism 118.

The shaft 115 is in axial alignment with the shaft 106 of the cash register, and the shaft 115 is tubular to receive a transmission shaft 119 which at its inner end is coupled to the inner end of the shaft 106 (Figure 14). At its outer end the transmission shaft 119 carries a gear 120 which meshes with the gear 121 rotatable on the stub shaft 122 extending from the wall 114, a dial 123 being secured to rotate with the gear 121. As the cash fare for which the fare box is designed is seven cents, the dial has thereon the indications 0—1—2—3—4—5—6, for indicating the cash deposited.

The nine-tenths inch token counting register 99 is assembled between the side walls 104 and 105 alongside of the cash register, its units dial 124 being secured to the shaft 125 which at its inner end carries the drive pinion 126, carry-over pinions 127 for the register assembly 99 being loosely mounted on a shaft 128 journalled in the side walls 104 and 105.

The dial wheels for the six-tenths inch token register 100 are assembled between the side walls 113 and 114 alongside the register 98, the shaft 129 secured to the unit dial 130 carrying at its inner end a drive pinion 131, the shaft 129 being in axial alignment with the shaft 125.

The carry-over pinions 132 for the register 100 are loosely mounted on a shaft 133 journalled in the side walls 113 and 114 in axial alignment with the shaft 128 and the carry-over pinions for the register 99.

Between the side walls 105 and 113 a coupling sleeve 134 is secured to the inner ends of the shafts 128 and 133 to form a continuous transmission link for control of the audible signal mechanism to be referred to more specifically hereinafter.

On a shaft 135 extending between the side walls 105 and 113 are mounted the transmission gears 136, 137, 138 and 139, the gears being individually rotatable on the shaft. The gear 136 meshes with the cash register drive pinion 111; the gear 137 meshes with the drive pinion 126 for the nine-tenths inch token register 99; the gear 138 meshes with the drive pinion 116 of the one-inch token register 98, and the gear 139 meshes with the drive pinion 131 of the six-tenths inch token register 100.

Between the drive pinions 126 and 131 is located a pinion 140 on a shaft which is journalled at its ends in bearing recesses in the drive pinions, the pinion 140 being in mesh with the transmission gear 138. Extending from the coupling bushing 134 is an arm 141 terminating at its lower end in a plate 142 (Figure 6) whose inner edge is in the path of the drive pinions 126 and 131 and the intermediate pinion 140, a spring 143 tending to yieldingly hold the plate against the teeth of the pinions so that when any of the pinions is rotated the plate will be shifted outwardly and the arm 141 swung to rotate the coupling sleeve and the shafts 128 and 133 secured to the coupling sleeve. Counting movements of the nine-tenths inch token register and the six-tenths inch token register are directly communicated by the drive pinions 126 and 131 to the arm 141 and the shafts 128 and 133, while the counting movement of the one-inch token register is communicated through the transmission gear 138 to the pinion 140, and thence to the arm 141.

Extending from the outer end of the shaft 128 and just inside the side wall 104 is a tripper arm 144 having a laterally deflected tripper end 145 which normally holds in inoperative position bell striking mechanism which will be described in detail later. The spring 143 serves to hold this tripper arm yieldingly in normal position, and when any of the token counting registers is operated and the shaft structures 128 and 133 rotated in the manner described, the tripper arm will be swung to release the bell striking mechanism for operation to give audible indication of the deposit of a fare token.

The sounding of the bell for indication of the deposit of a full cash fare is controlled by a pin 146 on the cash indicating dial 123 and a lever 147 extending from the outer end of the shaft 133. The pin and lever are so arranged that whenever the dial comes to the "0" indicating position, the lever will be swung for rotation of the shaft 133 and consequently rotation of the shaft 128 coupled thereto, and the trip arm 144 will swing to release the bell striking mechanism.

*The selective mechanism*

The register selective mechanism and the bell striking mechanism are mounted on a closure housing 148 for the register supporting frame. The selector mechanism is mounted between walls 149 and 150 extending rearwardly from the housing 148. A shaft 151 is journalled in these walls and secured to the shaft at the ends of its legs is the U-shaped frame 152. Mounted on the drive shaft between the legs of the U frame, and rotatable on the shaft, are the drive gears 153, 154, 155, 156, 157 and 158. The gear 158 meshes with the transmission gear 139 of the register mechanism, which transmission gear meshes with the drive pinion 131 for the six-tenths inch token counting register 100. The drive gear 157 meshes with the transmission gear 138, which in turn meshes with the drive pinion 116 for the one-inch token counting register 98. The drive gear 156 meshes with the transmission gear 137 which in turn meshes with the drive pinion 126 for the nine-tenths inch token counting register 98.

The drive gears 153, 154 and 155 are secured to a tubular shaft 159 which is journaled on the shaft 151 so that these three drive gears always rotate together. One of these gears, gear 155, meshes with the transmission gear 136, which in turn meshes with the drive pinion 111 for the cash counting register 97. When a nickel deposit is to be recorded the drive gear 155 will be directly rotated and when a deposited penny is to be counted the drive gear 154 is directly rotated, while if a deposited dime is to be counted the gear 153 will be directly rotated, but the rotation of any one of these three gears is transmitted to the cash counting register, the gear structure being rotated a distance of one tooth for entry of a deposited penny, a distance of five teeth for entry of a deposited nickel and a distance of ten teeth for the entry of a deposited dime.

Associated with each of the driving gears is a pawl 158, these pawls being hinged on a rod 160' extending between and secured in the legs of the U frame 152 adjacent the yoke of the frame. Each pawl is urged by a spring 161 towards the respective drive gear. The pawls move with the frame 152 but the driving connection of the pawls with the gears is determined by certain controlling mechanisms. Pawl controlling means is associated with each drive gear and comprises a pawl camming member 162 and a pawl releasing member 163, these members being in the form of metal plates rotatable on the shaft 151. This shaft, which carries the frame 152, extends through a wall 164 adjacent the wall 150 and at its outer end carries a gear 165 which meshes with gear teeth 166 on the hub of a lever 167 which is journalled on a stub shaft 168 extending from the wall 164. At its outer end this lever has the slot 169 which receives the pin 170 on the solenoid plunger 74.

When the plunger is in its lower position, the lever 167 will be in its downwardly swung position and when the plunger is raised the lever will be swung upwardly. The frame 152 is normally in a horizontal position and will be swung downwardly when the lever is raised by the plunger, and when the plunger moves downwardly to swing the lever down the frame will be swung back to its upper position.

Each pawl releasing member 163 has a radially extending arm 171 provided with a notch 172 in its outer end and when the frame 152 is in its normal or upper position, as shown in Figure 15 (dotted lines), the ends of the pawls will be projected into the notches of the respective releasing members. In such normal position the arms 171 of the releasing members press against the stop projections 173 on the cam members, these cam members having extensions 174 at their inner ends normally yieldingly held by springs 175 against a stop pin 176 which extends between the walls 149 and 150.

Each cam member 162 has a cam edge 177 extending from the stop extension 173 concentrically with the shaft 151, and these cam edges are normally engaged by the pawls so that the pawls are withheld from meshing engagement with the respective driving gears. Each driving gear has thirty teeth and for each downward swing of the frame 152 the pawls will travel around one-third of the driving gear circumference or the distance of ten teeth. However, the pawls are held from meshing engagement with the gear teeth, first, by the cam edges on the cam members, and, thereafter, by their engagement in the notches 172 of the pawl releasing members, and the release of any pawl for meshing and driving engagement with its associated drive gear is determined by selective mechanism which will now be described.

An abutment finger 178 is provided on each pawl releasing member at a point substantially diametrically opposite the pawl withholding extension 171. A short distance above the row of driving gears the selector element is disposed. This element comprises a shaft 179 journalled in the walls 149 and 150 and having a row of fingers projecting therefrom angularly displaced from each other. As there are six driving gears, there will be six fingers, a, b, c, d, e and f, these fingers being in alignment with the respective pawls releasing members 163 for projection into the paths of the abutment extensions 178 on these members. At one end the shaft 179 carries a pinion 180 which meshes with the teeth on a gear sector 181 which is pivoted on a stub shaft 182 extending from the wall 149. At its upper end the gear sector has a pin 183 for connection with the lower end of the rod 70 extending from the lever 66 of the spreading mechanism associated with the coin impeller mechanism.

Outside of the wall 160 the shaft 179 carries a ratchet wheel 184 having ratchet teeth thereon whose intervals correspond with the radial directions of the selector fingers on the shaft 179. On the shaft 151, which supports the frame 152, a detent pawl 185 is rotatably mounted, a spring 186 tending to hold this pawl in detent engagement with the ratchet wheel 184. Such detent engagement is maintained until near the end of the downward swing of the lever 167 when an abutment pin 187 on the shaft 151 engages with the hub of the pawl and swings the pawl to disengage it from the ratchet wheel. During the initial upward swing of the lever 167, which corresponds with the initial downward movement of the impeller carriage 10 when the solenoid plunger is raised, the pawl is released from the abutment pin and swung back by the spring into latching engagement with the ratchet wheel to prevent reverse rotation of the selector shaft 179. In the normal position of the parts, before the deposit of a coin or token, the spring 71, extending between the upper end of the link 70 and the bracket 72 on the wall 2 of the impeller structure, holds the gear sector 181 in its upper position with its toothed edge engaging at its lower end with the pinion 180 on the selector element shaft, and in this position none of the selector fingers will be in position to be abutted by the abutment extensions 178 on the pawl releasing members 163. However, upon deposit of a coin or token, the link 70 will be shifted downwardly a distance depending upon the diameter of the deposited coin or token and the gear sector 181 will be swung a corresponding distance to rotate the selector shaft for projection of the corresponding selector finger into the path of the abutment 178 on the pawl releasing member 163 associated with the driving gear which is to be actuated for registration of the deposited coin or token.

During downward swing of the frame 152 as the plunger rises all the pawl releasing members 163 will rotate with the frame, but when the abutment 178 on the releasing member corresponding to the selected finger reaches the finger, the releasing member will be stopped (Figure 17) but the pawl continues with the frame 152 until the engagement of the end of the pawl with the inclined edge of the notch 172 will swing the pawl out of the notch so that the pawl spring 161 may swing the pawl into mesh with the drive gear (Figure 18), and then, when the frame 152 is swung back to its upper position when the plunger moves down, the gear wheel will be rotated for an operation of the respective register to count the deposited coin or token. The extent of rotation of the driver gear will depend upon the extent of the cam edge 177 on the corresponding cam member 162. On the cam members associated with the driving gears for the token registers, the cam edges extend substantially for a distance of nine teeth on the drive gears. As before explained each downward swing of the frame 152 is for a distance equal to ten teeth on the driving gears, and the pawls are released from the releasing members so as to drop behind the tenth tooth of the gear.

Now, if a token has been deposited, the corresponding drive gear will be engaged by the released pawl and moved a distance of one tooth before the pawl will encounter the cam edge and be unmeshed from the drive gear, and this one tooth advance of the drive wheel will cause a one point advance of the units dial of the corresponding register. After the pawl is cammed out of mesh it will glide along the cam surface as the frame 152 is swung back to its upper or normal position, and during the final movement of the frame 152 to normal position, the pawl end will glide along the inclined front edge on the releasing member extension 171 to be returned to the slot 172. Those pawl releasing members which have not been stopped by the selector fingers will retain the corresponding pawls in their slots 172, and will be returned by the pawls to their normal position, all the releasing members then abutting against the stops 173 on the camming members.

For a six-tenths inch diameter token, a one inch diameter token and a nine-tenths inch diameter token, the selector fingers a, b and c, respectively, will be set and the corresponding drive gear advanced one tooth during upward movement of the frame 152 when the plunger returns to its lower position. When a penny is deposited, the selector finger e will be set for rotation of the drive gear 154 a distance of one tooth for a one point advance of the cash register. When a nickel is deposited, the selector finger d will be set for rotation of the drive gear 155 a distance of five teeth, and when a dime is deposited, the selector finger f will be set for rotation of the drive gear 153 a distance of ten teeth. As before explained, the drive gears 153, 154 and 155 are connected to rotate together, with the drive gear 155 meshing with the drive pinion for the cash register. The distance of rotation of this drive gear cluster is determined by the selector fingers associated with the respective gears and the extent of the cam edges of the corresponding pawl releasing members.

For operation of the gear cluster to register a penny, the cam edge on the cam member associated with the driving gear 154 will extend a distance so that after release of the pawl and advance of the gear cluster one tooth, the pawl will be cammed out of mesh. The cam edge on the cam member associated with the driving gear 155 will be of such extent that after the corresponding pawl is released for mesh with the gear 155, the gear will be advanced five teeth before the pawl is cammed out of mesh. The cam edge on the cam member associated with the driving gear 153 is short and the pawl after release and meshing with the drive gear will cause a ten tooth advance thereof before the pawl is unmeshed by the cam edge, the five-tooth advance and the ten-tooth advance causing respectively the registration of a deposited nickel or a deposited dime.

The ends of the extensions 174 on the cam members are deflected to form detents 188. When the pawl releasing members are brought into abutting engagement with the stop extensions 173 on the cam members during final movement of the frame 152 to normal position, the cam members are rotated a slight distance against the pull of the springs 175 and project their detent ends 188 into the teeth of the transmission gears 136, 137, 138 and 139 of the register driving train to lock the registers against movement. As soon as the frame 152 starts its downward movement, the cam members will be released and the springs will withdraw the detents from the transmission gears so that the registers will be free for operation. At the end of the downward swing of the lever 167 and upward swing of the frame 152 back to normal position, the ratchet pawl 185 will be withdrawn from the ratchet wheel 184 so that the spring 77 may draw up the link 78 for setting of the gear sector 81 and the setting levers 57 and 58 back to normal position (dotted lines Figure 9).

The bell striker mechanism is mounted on the wall 164 on the housing 148 for striking a bell 189 located at the bottom of the main housing 1. A stub shaft 190 extends from the wall 164 on which is mounted the disc 191 from which the arm 192 extends to support a striker piece 193. A spring 194 tends to swing this striker structure toward the bell but such movement is normally prevented by the engagement of the detent tooth 195 by the detent end 145 on the tripper arm 144 already described. During the downward movement of the solenoid plunger the trip lever is swung to unlatch the striker mechanism and the bell is struck to indicate the deposit of a fare. During the next upward movement of the solenoid and upward swing of the lever 167, the striker mechanism will be reset to latching position. The resetting means comprises a hub 196 rotatable on the shaft 190 which hub carries a gear 197 meshing with the gear 165. Between the hub and the disc 191 of the striker mechanism is located a cam plate 198 which is held against movement by its slotted end 199 receiving the end of the shaft 151 on which the gear 105 is secured. On the hub 196 is pivoted a pawl 200 whose end 201 is deflected laterally to extend across the cam disc and into the path of a resetting tooth 202 on the disc 191 supporting the striker arm. When the striker arm is down the pawl end 201 will be behind the resetting tooth 202 and this engagement remains while the lever 167 is swung upwardly so that the disc 191 is rotated back to normal position for engagement of its detent tooth 195 by the trip lever 144. Just before relatching of the striker disc the end of the resetting pawl engages the cam ridge 203 on the cam disc and the pawl is released from the resetting tooth 202 so that the striker mechanism will then be held solely by the trip lever 144. When the lever 167 then swings downwardly for actuation of the selector register mechanism to register a deposited coin or token, the trip lever will be moved to release the striker mechanism and the bell will be sounded. A stop post 204 extending from the wall 150 stops the downward swing of the disc 191 just before the striker piece 193 strikes the bell so that the bell will be struck by the striker piece 193 after a slight flexure of the spring arm 192.

As best shown in Figure 2, the cash fare indicating dial 123 is within the enclosing housing 1 behind a window 205. The deposits, either coins or tokens, after release from the impeller mechanism, are received in the inspection chamber 206 where they are supported by the shelf 207 for inspection by the conductor or attendant. By means of suitable mechanism 208 the shelf 207 may be tipped for dropping of coins or tokens into a chute 209 from which they may be received by the conductor or attendant. The various registers are visible through a window 210.

I have shown a practical and efficient embodiment of the various features of my invention, but I do not desire to be limited to the exact construction, arrangement and operation shown and described, as changes and modifications may readily be made without departing from the scope of the invention.

I claim:

1. In a fare box, means for receiving deposited coins of different denominations, a register for totalizing the cash value of deposited coins, a driving gear for each coin denomination and a driving train connecting said gear with said register, an actuating member, pawls on said actuating member for driving engagement with the respective driving gears, means normally withholding said pawls from said gears, selecting means automatically controlled by a deposited coin for effecting driving engagement of a pawl with the corresponding denomination gear whereby said gear may be rotated, and means arranged to withdraw said pawl from said gear after rotation of said gear for entry of the coin denomination in said register.

2. In a fare box, means for receiving deposited coins of different denominations, a register for totalizing the cash value of deposited coins, driving gears each corresponding to one of the coin denominations, a common transmission train for connecting said gears with said register, an actuator member adapted for forward and reverse movement, individual pawls on said actuator member for driving engagement with the respective gears, a pawl releasing member associated with each driving gear, said pawl releasing members holding said pawls unmeshed from said gears during forward movement of said actuator member, selector means controlled by the size of a deposited coin for selecting the corresponding pawl releasing member for releasing the pawl for driving engagement with the corresponding gear at the end of the forward movement of said actuator member whereby said gear will be rotated during reverse movement of said actuator member, and a cam member associated with each gear for camming the driving pawl out of mesh after rotation of the drive gear to enter the cash value of a deposited coin in the register.

3. In a fare box, means for receiving deposited coins of different denominations, a register for totalizing the cash value of deposited coins, a plurality of driving gears one for each coin denomination and a common transmission train connecting said gears with said register, an actuator element adapted for forward and reverse movement, pawls on said actuator element for driving connection with the respective gears during reverse movement of said actuator element, a pawl withholding and releasing element associated with each gear and rotatable independently thereof, said withholding and releasing element arranged to withhold said pawls from said gears during forward movement of said actuator element, selector means controlled by the size of a deposited coin for arresting the corresponding withholding and releasing element near the end of the forward movement of said actuator element whereby during final forward movement of said actuator element the corresponding pawl will be released for driving engagement with the corresponding gear, and a cam element associated with each gear for unmeshing the corresponding pawl from the gear after rotation of the gear by the reverse movement of said actuator member a distance to drive the register for entry of the cash value of a deposited coin.

4. In a fare box, means for receiving coins of different denominations, a single register for totalizing the cash value of deposited coins, a plurality of driving members one corresponding to each coin denomination and a common transmission train between said driving members and register, an actuator member for said driving members arranged for forward and reverse movement, individual coupling members on said actuator member for actuating engagement with said driving members during reverse movement of said actuator member, a controlling member associated with each driving member and arranged to withhold the associated coupling member from the driving member during forward movement of the actuator member, selective stop members for said controlling members arranged to be automatically set in accordance with the diameters of deposited coins, said stop members being adapted to stop further movement of the corresponding controlling members for release of the corresponding coupling members for driving engagement thereof with the driving members whereupon said driving members will be driven during reverse movement of said actuator member for operation of the register, and cam means associated with each driving member for effecting disengagement of the coupling member from the driving member after driving of the register to register the deposited coin.

5. In a fare box, means for receiving deposited coins of different denominations, a register for totalizing the cash value of deposited coins, driving elements each corresponding to one of the coin denominations, a common transmission train between said driving elements and said register, an actuator element for said driving elements arranged for forward and reverse movement, coupling members on said actuator element, a withholding element associated with each driving element and operable to withhold the corresponding coupling element from the driving element during forward movement of said actuator element, selective means for controlling the operation of said withholding means, setting means controlled by the size of a deposited coin for setting said selector means for control of the corresponding withholding means, the control of the selector and withholding means effecting release of the corresponding coupling means with the corresponding driving element whereby said driving element will be moved during reverse movement of said actuator element for operation of said register, and cam means associated with each driving element for disconnecting the coupling element therefrom after operation of the register to enter the cash value of a deposited coin.

6. In a fare box, a plurality of registers, a driving gear for each register connected therewith by a transmission train, an actuator member having pawls thereon for driving connection with the respective driving gears, said actuator being adapted for forward and reverse movement, a separately mounted pawl controlling member associated with each driving gear and movable with said actuator independently of said gear, and operable to withhold the corresponding pawl from driving engagement with the gear during forward movement of said actuator member, a selector member comprising a rotatable shaft having a plurality of angularly disposed stop fingers extending therefrom, means controlled by a deposited coin or token for setting said selector member for projection of one of said stop fingers in the path of the controlling member for the corresponding gear, the projected finger stopping the controlling member near the end of forward movement of said actuator member for release of the associated pawl from the controlling member during final forward movement of the actuator member whereby said pawl may move into driving engagement with said gear and said gear rotated during reverse movement of said actuator member for actuation of the corresponding register to count the deposited coin or token.

7. In a fare box, a plurality of registers for counting deposited coins or tokens, a driving gear for each register connected therewith by a transmission train, an actuator member arranged for forward and reverse movement and having pawls thereon adapted for driving engagement with the respective driving gears, a separately mounted controlling member associated with each driving gear and movable with said actuator independently of said gear and arranged to withhold the pawl from the gear during forward movement of said actuator member, a selector member associated with said controlling members and comprising a rotatable shaft with angularly displaced fingers extending therefrom for projection into the path of movement of the respective controlling members, setting means controlled by a deposited coin or token for setting said selector element for stopping of the corresponding controlling member at the end of forward movement of said actuator member, means whereby such stopping of a controlling member will effect release of the driving pawl therefrom and driving engagement of the pawl with the gear whereby said gear may be rotated during reverse movement of said actuator member, and a cam member associated with each driving gear operable to release the driving pawl from the gear after rotation of the gear for operation of the associated register to register the deposited coin or token.

8. In a fare box, a plurality of registers, a driving gear for each register, an actuator member movable in forward and reverse direction concentric with said driving gears and carrying coupling members adapted for driving engagement with said gears, a controlling member associated with each gear, said controlling members being operable to withhold said coupling members from said gears during forward movement of said actuator member and to release said coupling members for driving engagement with the gears at the end of forward movement of said actuator member, means controlled by deposited coins or tokens for selecting said controlling members for operation, and a cam member associated with each gear for camming the corresponding coupling member away from the gear after sufficient rotation of the gear by the actuator member to enter the deposited coin or token on the corresponding register.

9. In a fare box, a register, a driving gear connected with said register, an actuator member movable in forward and reverse direction concentric with said gear and carrying a coupling member adapted for driving connection with said gear, a withholding member rotatable independently of said gear and arranged to withhold said coupling member from said gear during forward movement of said actuator member, stop means controlled by a deposited coin or token for stopping said withholding member near the end of the forward movement of said actuator member whereby upon final forward movement of said actuator member said coupling member may be released for driving engagement with said gear and said gear rotated during reverse movement of said actuator member, and a cam member for disconnecting said coupling member from said gear after rotation of said gear for operation of the register to count the deposited coin or token.

10. In a fare box, a plurality of registers, a driving member for each register, a single actuator member movable in forward and reverse direction relative to said driving members and carrying coupling members adapted for driving engagement with said driving members, a controlling member associated with each driving member, said controlling members being operable to withhold said coupling members from said driving members during forward movement of said actuator member and to release said coupling members for driving engagement with said driving members at the end of forward movement of said actuator member, means controlled by deposited coins or tokens for selecting said controlling members for operation, and means associated with each driving member and effective in the reverse movement of the actuator member to uncouple the corresponding coupling member from the driving member after sufficient movement of the driving member by the actuator member to enter the deposited coin or token on the corresponding register.

11. In a fare box, a plurality of registers, a driving member for each register, a single actuator member movable in forward and reverse direction alongside of said driving members and carrying coupling members adapted for driving engagement with said driving members, a controlling member associated with each driving member, said controlling members being movable with said actuator member and unless restrained serving to hold said coupling members from coupling engagement with said driving members during forward and reverse movement of said actuator member, selective means controlled by deposited coins or tokens for selecting said controlling members whereby a selected controlling member will be restrained from further movement with said actuator member during forward movement of said actuator member, and means whereby restraining of the selected controlling member will cause release therefrom of the associated coupling member and coupling connection of the coupling member with the corresponding driving member whereby said driving member will be operated during reverse movement of said actuator member, and means effective during such reverse movement for uncoupling the coupling member from the driving member after sufficient movement thereof to effect entry of the deposited coin or token on the corresponding register.

12. In a fare box, a plurality of registers, a driving means for each register, a single actuator member movable in forward and reverse direction alongside of said driving means and carrying coupling members adapted for driving engagement with driving means, a controlling member associated with each driving member, said controlling members being normally free to move with said actuator member and arranged to withhold said coupling members from said driving means during forward and reverse movement of said actuator member, selecting means controlled by deposited coins or tokens for selecting said controlling means for restraint thereof against further movement with said actuator member at the end of forward movement of said actuator member, means whereby such restraint of a selected controlling member will cause disconnection therefrom of the associated coupling member and engagement of said coupling member with the associated driving means whereby upon reverse movement of said actuator member said driving means will be actuated, and releasing means associated with each driving means and effective in the reverse movement of the actuator member for releasing the coupling member from the driving means after sufficient movement of the driving means by the actuator member to enter the deposited coin or token on the corresponding register.

13. In a fare box, a plurality of registers, a driving member for each register, a single actuator member movable in forward and reverse direction alongside of said driving members and carrying coupling members adapted for driving engagement with said driving members, a controlling member associated with each driving member, said coupling members normally engaging said controlling members to cause movement thereof with said actuator member but being held thereby out of coupling engagement with said driving members, selector means for said controlling members controlled by deposited coins or tokens, means whereby a selected controlling member will be controlled for release of the coupling member therefrom and engagement of the coupling member with the corresponding driving member for movement of the driving member during reverse movement of the actuator member, and means effective during such reverse movement for disengaging the coupling member from the driving member after sufficient movement of the driving member to enter the deposited coin or token on the corresponding register.

14. In a fare box, a plurality of registers, a driving member for each register, a single actuator member, individual coupling members mounted on said actuator for coupling said actuator with the respective driving members, withholding members normally withholding said coupling members from said driving members, said driving members and said actuator member and said withholding members being rotatable on a common axis, and selecting means controlled by a deposited coin or token and effective to control a selected withholding member for release of the corresponding coupling member and engagement thereof with the corresponding driving member whereby said driving member may be operated.

15. In a fare box, a plurality of registers, a driving member for each register, an actuator member movable in a forward and reverse direction, coupling members carried by said actuator member for selective coupling engagement with said driving members, a controlling member associated with each coupling member, said controlling members unless restrained functioning to withhold said coupling members from said driving members during forward and reverse movement of said actuator member, means controlled by deposited coins or tokens for selectively restraining said controlling members whereby restraint of one of said controlling members will result in release of the associated coupling member for coupling connection thereof with the corresponding driving member and movement of the driving member during reverse movement of the actuator member for operation of the corresponding register, and means effective during such reverse movement for breaking the coupling connection after sufficient movement of the driving member for entry of the deposited coin on the register.

16. In a fare box, a register for totalizing the cash value of coins of different denominations, driving members each corresponding to one of the coin denominations, a common transmission train connecting said driving means with said register, an actuator movable in forward and reverse direction, individual coupling members for said driving members movable with said actuator, means normally withholding said coupling members from said driving members, selecting means controlled by a deposited coin and effective to control said withholding means for release of the coupling member corresponding to the denomination of the deposited coin at the end of the forward movement of said actuator and engagement of the released coupling member with the corresponding driving member for operation of the driving member during reverse movement of the actuator, and means effective in such reverse movement for disengaging the coupling member from the driving member after sufficient movement of the driving member to enter the deposited coin on the corresponding register.

17. In a fare box, a plurality of registers, a driving gear for each register, an actuator member movable in forward and reverse direction concentric with said driving gears, coupling members for coupling said gears to said actuator member, a controlling member associated with each gear, said controlling members being operable to prevent coupling of said gears to said actuator member during forward movement of said actuator member and to permit coupling connection at the end of the forward movement of said actuator member, means controlled by deposited coins or tokens for selecting said controlling members for operation, and means effective in the reverse movement of said actuator member and a gear coupled thereto for breaking the coupling connection after sufficient rotation of the gear by the actuator member to enter the deposited coin or token on the corresponding register.

ERNEST H. THOMPSON.